(12) United States Patent
Yoon et al.

(10) Patent No.: US 10,929,563 B2
(45) Date of Patent: Feb. 23, 2021

(54) ELECTRONIC DEVICE AND METHOD FOR PROTECTING USERS PRIVACY

(71) Applicant: Samsung Electronics Co., Ltd., Suwon-si (KR)

(72) Inventors: Su Ha Yoon, Seoul (KR); Sin Jae Kang, Yongin-si (KR); Byung Sung Kang, Suwon-si (KR); Sae Rome Kim, Suwon-si (KR); In Su Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/222,276

(22) Filed: Dec. 17, 2018

(65) Prior Publication Data

US 2019/0138752 A1 May 9, 2019

Related U.S. Application Data

(63) Continuation of application No. 14/305,604, filed on Jun. 16, 2014, now abandoned.

(30) Foreign Application Priority Data

Feb. 17, 2014 (KR) .................. 10-2014-0017665

(51) Int. Cl.
*G06F 21/62* (2013.01)
*H04W 12/02* (2009.01)
(Continued)

(52) U.S. Cl.
CPC ........ *G06F 21/6263* (2013.01); *H04W 12/02* (2013.01); *H04L 61/2038* (2013.01);
(Continued)

(58) Field of Classification Search
CPC . G06F 21/6263; H04L 63/04; H04L 63/0421; H04L 61/6022; H04W 12/00512
See application file for complete search history.

(56) References Cited

U.S. PATENT DOCUMENTS 7,320,070 B2  1/2008  Baum
7,359,989 B2  4/2008  Orava et al.
(Continued)

FOREIGN PATENT DOCUMENTS

JP    2006-157293 A    6/2006
JP    2011-129968 A    6/2011
(Continued)

OTHER PUBLICATIONS

Korean Office Action dated Oct. 23, 2020, issued in Korean Patent Application No. Oct. 2015-0023344.

*Primary Examiner* — Sher A Khan
(74) *Attorney, Agent, or Firm* — Jefferson IP Law, LLP

(57) ABSTRACT

An electronic device protecting privacy of a user is provided. The electronic device includes a transceiver configured to transmit and receive wireless communication signals of Wi-Fi networks, and at least one processor configured to detect occurring of an event for identifying a location of the electronic device, determine whether to use the Wi-Fi networks for identifying the location of the electronic device, control the transceiver to perform an active scan, when the Wi-Fi networks is used to identify the location of the electronic device, and control the transceiver to transmit one or more probe request frames including a virtual media access control (MAC) address to an access point of the Wi-Fi networks for identifying the location of the electronic device, when the transceiver to be performed in the active scan.

13 Claims, 8 Drawing Sheets

(51) Int. Cl.
*H04L 29/12* (2006.01)
*H04L 29/06* (2006.01)
*H04W 12/00* (2021.01)

(52) U.S. Cl.
CPC .......... *H04L 61/6022* (2013.01); *H04L 63/04* (2013.01); *H04L 63/0421* (2013.01); *H04W 12/00512* (2019.01)

(56) References Cited

U.S. PATENT DOCUMENTS

| | | | |
|---|---|---|---|
| 7,633,953 B2 | 12/2009 | Haverinen et al. | |
| 7,836,160 B2 | 11/2010 | Baum | |
| 7,843,923 B2 | 11/2010 | Baum | |
| 7,843,934 B2 | 11/2010 | Baum et al. | |
| 7,844,814 B2 | 11/2010 | Baum | |
| 7,958,541 B2 | 6/2011 | Wu et al. | |
| 8,170,499 B2 | 5/2012 | Kim et al. | |
| 8,458,700 B1* | 6/2013 | Arrance | G06F 9/45558 718/1 |
| 8,578,488 B2 | 11/2013 | Park et al. | |
| 8,724,599 B2* | 5/2014 | Kim | H04W 48/16 370/338 |
| 8,983,493 B2* | 3/2015 | Brachet | G01S 5/0242 455/456.1 |
| 9,717,005 B2* | 7/2017 | Lee | H04W 48/20 |
| 2003/0177267 A1 | 9/2003 | Orava et al. | |
| 2004/0029580 A1 | 2/2004 | Haverinen et al. | |
| 2004/0240422 A1 | 12/2004 | Kim | |
| 2005/0050352 A1 | 3/2005 | Narayanaswami et al. | |
| 2005/0089010 A1* | 4/2005 | Rue | H04L 29/06 370/349 |
| 2007/0086369 A1 | 4/2007 | Tang | |
| 2007/0243888 A1* | 10/2007 | Faccin | H04W 48/14 455/461 |
| 2007/0258409 A1* | 11/2007 | Alizadeh-Shabdiz | H04W 64/006 370/331 |
| 2007/0288994 A1 | 12/2007 | Tang | |
| 2008/0008117 A1 | 1/2008 | Alizadeh-Shabdiz | |
| 2008/0056211 A1 | 3/2008 | Kim et al. | |
| 2008/0092228 A1 | 4/2008 | Baum | |
| 2008/0130542 A1* | 6/2008 | Tang | H04L 29/12839 370/311 |
| 2008/0134291 A1 | 6/2008 | Wu et al. | |
| 2008/0181187 A1 | 7/2008 | Scott et al. | |
| 2008/0222368 A1* | 9/2008 | Gehrmann | G06F 21/572 711/152 |
| 2008/0305786 A1* | 12/2008 | Arumi | H04W 52/0274 455/426.1 |
| 2009/0046673 A1* | 2/2009 | Kaidar | H04W 48/12 370/337 |
| 2009/0063706 A1* | 3/2009 | Goldman | H04L 45/66 709/250 |
| 2009/0098883 A1* | 4/2009 | Yoon | H04M 1/72572 455/456.1 |
| 2009/0143067 A1* | 6/2009 | Kim | H04N 5/44 455/434 |
| 2009/0274121 A1 | 11/2009 | Bertorelle et al. | |
| 2009/0304025 A1 | 12/2009 | Boucadair et al. | |
| 2010/0103844 A1 | 4/2010 | Kim | |
| 2011/0179486 A1 | 7/2011 | Park et al. | |
| 2012/0021760 A1* | 1/2012 | Strohbach | G01S 5/0289 455/456.1 |
| 2012/0063340 A1 | 3/2012 | Waters et al. | |
| 2012/0083308 A1 | 4/2012 | Wang et al. | |
| 2012/0213211 A1* | 8/2012 | Remaker | H04L 61/2092 370/338 |
| 2012/0257753 A1* | 10/2012 | Ochikubo | H04W 12/02 380/270 |
| 2012/0324482 A1 | 12/2012 | Park | |
| 2013/0237192 A1 | 9/2013 | Kim et al. | |
| 2014/0044134 A1 | 2/2014 | Rajamanickam | H04L 61/6022 370/400 |
| 2014/0047128 A1* | 2/2014 | Correll | H04L 61/6004 709/245 |
| 2014/0050210 A1 | 2/2014 | Waters et al. | |
| 2014/0071821 A1* | 3/2014 | Fang | H04W 48/00 370/230 |
| 2014/0146805 A1 | 5/2014 | Lee et al. | |
| 2014/0196158 A1 | 7/2014 | Buck | |
| 2014/0337950 A1* | 11/2014 | Yang | H04L 9/3236 726/7 |
| 2015/0063205 A1 | 3/2015 | Elliott | |
| 2015/0105098 A1* | 4/2015 | Sridhara | G01S 5/0252 455/456.1 |
| 2015/0163667 A1 | 6/2015 | Ginzboorg et al. | |
| 2015/0350832 A1* | 12/2015 | Chen | H04W 4/023 455/457 |
| 2016/0018507 A1* | 1/2016 | Chen | H04W 4/029 455/456.2 |
| 2016/0219408 A1* | 7/2016 | Yang | H04W 52/0245 |
| 2017/0078851 A1* | 3/2017 | Agrawal | H04W 4/021 |
| 2018/0007516 A1* | 1/2018 | Ge | H04W 64/00 |

FOREIGN PATENT DOCUMENTS

| | | |
|---|---|---|
| JP | 2013-046406 A | 3/2013 |
| KR | 10-2009-0056185 A | 6/2009 |
| KR | 10-2010-0040792 A | 4/2010 |
| KR | 10-2012-0126674 A | 11/2012 |

* cited by examiner

ELECTRONIC DEVICE AND METHOD FOR PROTECTING USERS PRIVACY

CROSS-REFERENCE TO RELATED APPLICATION(S)

This application is a continuation application of prior application Ser. No. 14/305,604, filed on Jun. 16, 2014, which was based on and claimed priority under 35 U.S.C. § 119(a) of a Korean patent application filed on Feb. 17, 2014 in the Korean Intellectual Property Office and assigned Serial number 10-2014-0017665, the disclosure of which is incorporated by reference herein in its entirety.

TECHNICAL FIELD

The present disclosure relates to an electronic device and method for selecting a scan method used during wireless communication and selecting whether to change a Media Access Control (MAC) address according to the scan method to protect a user's privacy.

BACKGROUND

In general, an electronic device may perform wireless communication with an external electronic device by using active scan and passive scan. At this point, the electronic device searches for at least one external electronic device and performs communication with a located external electronic device by using an original Media Access Control (MAC) address assigned thereto. Then, a user of the electronic device may use a service such as internet browsing through wireless communication.

Regardless of a user's intention, since the external electronic device collects the original MAC address of the electronic device using the active scan, the privacy of the electronic device's user, for example, the user's position and path of movement, may be exposed.

Accordingly, an electronic device and method for protecting a user's privacy, for example, the user's position and moving path, by selectively performing active scan and passive scan is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for protecting a user's privacy, for example, the user's position and moving path, by selectively performing active scan and passive scan.

Another aspect of the present disclosure is to provide an electronic device and method for changing a Media Access Control (MAC) address by generating and providing a virtual MAC address while the electronic device uses active scan.

In accordance with an aspect of the present disclosure, an electronic device protecting privacy is provided. The electronic device includes a communication module configured to perform wireless communication, and a control module configured to select one of an active scan and a passive scan by controlling the communication module.

In accordance with another aspect of the present disclosure, a method of protecting privacy is provided. The method includes selecting, by a control module, one of an active scan and a passive scan, and activating, by the control module, a communication module according to the selection.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
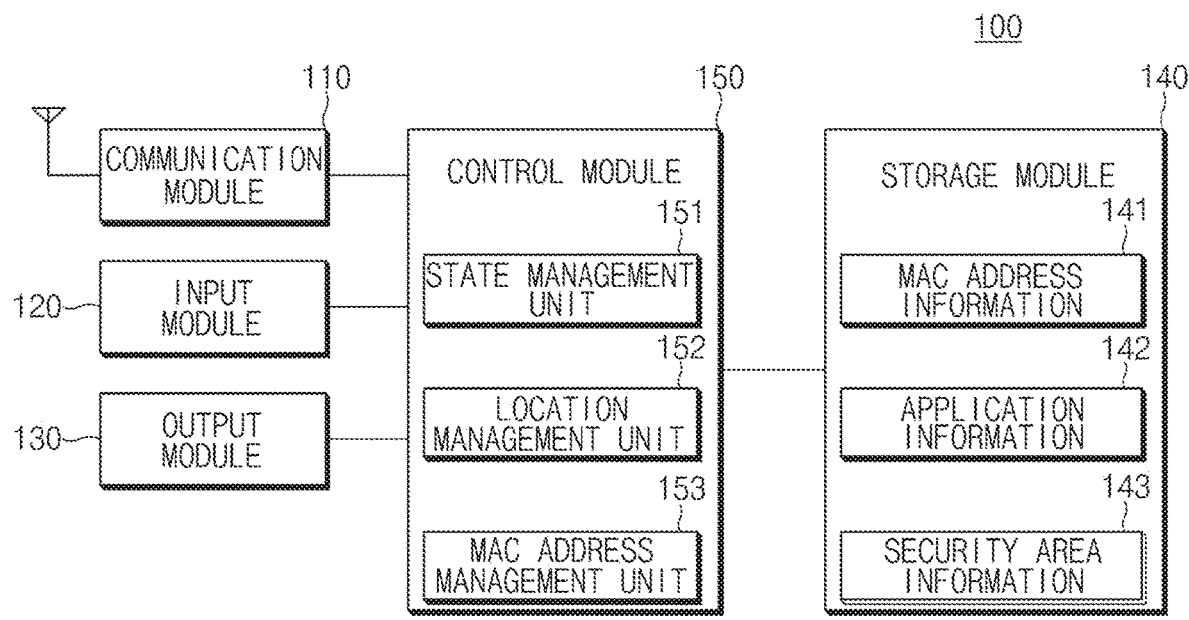
FIG. 1 is a block diagram illustrating a main configuration of an electronic device protecting a user's privacy according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising," specifies a property, a region, a fixed number, a step, a process, an element and/or a component but does not exclude other properties, regions, fixed numbers, steps, processes, elements and/or components. The term "include," "comprise," "including," or "comprising," specifies a property, a region, a fixed number, a step, a process, an element and/or a component but does not exclude other properties, regions, fixed numbers, steps, processes, elements and/or components.

The terms 'first' and/or 'second' may be used to describe various elements, but the elements should not be limited by these terms. For example, the above expressions do not limit the order and/or importance of corresponding components. The expressions are used to distinguish one component from another component. For example, a first user device and a second user device are all user devices and represent different user devices. For example, a first component may be referred to as a second component and vice versa without departing from the scope of the present disclosure.

In this specification, the expression "or" includes any or all combinations of words listed. For example, "A or B" may include A or include B or include both A and B.

In this disclosure below, when one part (or element, device, and the like) is referred to as being 'connected' to another part (or element, device, and the like), it should be understood that the former may be 'directly connected' to the latter, or 'electrically connected' to the latter via an intervening part (or element, device, and the like). It will be further understood that when one component is referred to as being 'directly connected' or 'directly linked' to another component, it means that no intervening component is present.

Terms used in this specification are used to describe specific various embodiments, and are not intended to limit the scope of the present disclosure. The terms of a singular form may include plural forms unless they have a clearly different meaning in the context.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

An electronic device according to this specification may be a device that includes a communication function. For example, an electronic device may include at least one of wireless communication-enabled smartphones, tablet personal computers (PCs), mobile phones, video phones, e-book readers, desktop PCs, laptop PCs, netbook computers, Personal Digital Assistants (PDAs), Portable Multimedia Players (PMPs), MP3 players, mobile medical equipment, cameras, or wearable devices (for example, Head-Mounted-Devices (HMDs) such as electronic glasses, electronic clothing, electronic bracelets, electronic necklaces, appcessories, electronic tattoos or smartwatches).

According to an embodiment of the present disclosure, an electronic device may be smart home appliance having a communication function. Smart home appliances, for example, electronic devices may include at least one of Digital Video Disk (DVD) players, audios, refrigerators, air conditioners, vacuum cleaners, ovens, microwaves, washing machines, air purifiers, set-top boxes, TV boxes (for example, the Samsung HomeSync™, Apple TV™, or Google TV™), game consoles, electronic dictionaries, electronic keys, camcorders, or electronic frames.

According to an embodiment of the present disclosure, an electronic device may include at least one of various medical devices (for example, Magnetic Resonance Angiography (MRA) devices, Magnetic Resonance Imaging (MRI) devices, Computed Tomography (CT) devices, medical imaging devices, ultrasonic devices, and the like), navigation devices, Global Positioning System (GPS) receivers, Event Data Recorders (EDRs), Flight Data Recorders (FDRs), vehicle infotainment devices, marine electronic equipment (for example, marine navigation systems, gyro compasses, and the like), avionics, security equipment, car head units, industrial or household robots, financial institutions' Automatic Teller's Machines (ATMs), and stores' Point Of Sales (POS).

According to an embodiment of the present disclosure, an electronic device may include at least one of furniture or buildings/structures having a communication function, electronic boards, electronic signature receiving devices, projectors, or various measuring instruments (for example, water, electricity, gas, or radio signal measuring instruments). An electronic device according to an embodiment of the present disclosure may be one of the above-mentioned various devices or a combination thereof. Additionally, an electronic device according to an embodiment of the present disclosure may be a flexible device. Furthermore, it is apparent to those skilled in the art that an electronic device according to an embodiment of the present disclosure is not limited to the above-mentioned devices.

Hereinafter, various embodiments of the present disclosure will be described in more detail with reference to the accompanying drawings. The term "user" in various embodiments may refer to a person using an electronic device or a device using an electronic device (for example, an artificial intelligent electronic device).

FIG. 1 is a block diagram illustrating a main configuration of an electronic device protecting a user's privacy according to an embodiment of the present disclosure.

Referring to FIG. 1, the electronic device may 100 include a communication module 110, an input module 120, an output module 130, a storage module 140, and a control module 150, but is not limited thereto. The storage module 140 includes Media Access Control (MAC) address information 141, application information 142, and security area information 143, and the control module 150 includes a state management unit 151, a location management unit 152, and a MAC address management unit 153.

The communication module 110 may connect a communication between the electronic device 100 and external devices (another electronic device (not shown) or a server device (not shown)). For example, the communication module 110 may communicate with an external device through wireless communication or wired communication. The wired communication, for example, may include at least one of a Universal Serial Bus (USB), High Definition Multimedia Interface (HDMI), Recommended Standard 232 (RS-232), or Plain Old Telephone Service (POTS).

The wireless communication, for example, may include at least one of short-range communication (for example, Zigbee, Bluetooth Low Energy (BLE), and Near Field Communication (NFC)), Ibeacon, proximity communication, Wi-Fi, GPS or cellular communication (for example: Long Term Evolution (LTE), Long Term Evolution Advanced (LTE-A), Code Division Multiple Access (CDMA), Wideband Code Division Multiple Access (WCDMA), Universal Mobile Telecommunications System (UMTS), Wireless Broadband (WiBro), or Global System for Mobile communications (GSM)). Additionally, the communication module 110 may provide voice calls, video calls, chat messages, text message services, multimedia message services or Internet services through the cellular communication. At this point, various embodiments in this specification use Wi-Fi communication for convenience of description but the present disclosure is not limited thereto. That is, the present disclosure is realized through any one type of wireless communication listed herein. Furthermore, various embodiments of the present disclosure may be realized by the detection of a magnetic field transmitted from an external device.

According to an embodiment of the present disclosure, the communication module 110 may include a wireless communication chip (hereinafter referred to as the communication module 110) for wireless communication, for example, Wi-Fi and once power is applied to the electronic device 100, power may also be applied to the communication module 110. The communication module 110 may provide one MAC address of an original MAC address of the electronic device 100 assigned during manufacturing and at least one of a virtual MAC address generated from the control module 150 by a selection of the control module 150. The communication module 110 includes a MAC address in a Probe Request Frame by a control of the control module 150 and provides the MAC address to another electronic device (not shown) or an Access Point (AP) and performs an active scan receiving a Probe Response Frame from another electronic device or an AP and providing a MAC address. The communication module 110 may perform a passive scan receiving information broadcasted from another electronic device or an AP. Although it is described above that the communication module 110 receives AP information, the communication module 110 may perform passive scan by receiving at least one AP information, GPS information, Cell-ID information, LTE location information, or Beacon information in a threshold range. At this point, the AP information may be information for determining whether wireless communication through an AP is used in a security area. The communication module 110 may receive information relating to the communication capacity of an AP and service information broadcasted from an AP. The communication module 110 may include the original MAC address of the electronic device 100.

The input module 120 may generate an operation signal for operating the electronic device 100 according to an input and may provide the operation signal to the control module 150. The input module 120 may generate a wireless communication activation signal according to an input. The input module 120 may generate a signal for executing an application according to an input. The input module 120 may generate an entry signal for entering a security mode according to an input. The input module 120 may generate a select signal for selectively performing active scan and passive scan. The input module 120 may generate a select signal for selectively transmitting at least one of a virtual MAC address or an original MAC address. The input module 120 may be formed as an input device such as a key button, a keyboard, a keypad, a touch pad, and a touch screen.

The output module 130 may display an execution screen operating according to a control of the control module 150. For this, the output module 130 may be formed of a Liquid Crystal Display (LCD) or a touch screen and if the output module 130 is formed of a touch screen, the output module 130 may perform the role of the input module 120 simultaneously. When the output module 130 is formed of a touch screen, the output module 130 may display a virtual button for generating a wireless communication activation signal and a virtual button for generating a signal for executing an application. The output module 130 may display a pop-up window for providing notice of the entry or exit to the security area. The output module 130 may display a pop-up window for selecting the performance of active scan or passive scan and may display a pop-up window for selecting the transmission of at least one of a virtual MAC address and an original MAC address.

The storage module 140 may store a program or an application for operating the electronic device 100. Additionally, the storage module 140 may include MAC address information area 141 for storing the original MAC address of the electronic device 100 assigned to the communication module 110 and at least one of a virtual MAC address generated from the control module 150. The storage module 140 may include an application information area 142 for storing specific application information that requires privacy protection. At this point, the specific application may be an application relating to the positioning of the electronic device 100, wireless communication setting, wireless communication roaming, a map, and location-based service or may be an application for operating the electronic device 100 in a security mode.

The storage module 140 may include a security area information area 143 for storing information on an AP for determining the entry or exit to a specific area. The security area information 143 may store AP information, GPS information, Cell-ID information, and LTE location information.

The control module 150 may selectively perform one of active scan and passive scan by controlling the communication module 110. According to an embodiment of the present disclosure, the state management unit 151 may check the occurrence of a scan event. At this point, the scan event may be an event for activating wireless communication in the input module 120, for example, an event for selecting an icon or a menu item provided in relation to wireless communication activation. The scan event may be a signal for application execution through the input module 120 or may be an operation signal of an application automatically executed during the booting of the electronic device 100. The scan event may be a signal allowing the electronic device 100 to enter a specific area by analyzing AP information received from the communication module 110. The location management unit 152 may receive AP information from at least one AP or at least one of an external electronic device located within a threshold range of the electronic device 100 by controlling the communication module 110. The location management unit 152 may check whether the electronic device 100 enters a specific area by analyzing the received AP information and comparing the received AP information with AP information stored in the security area information 143. At this point, the specific area may mean a security area for monitoring the position and moving path of the electronic device 100 when the electronic device 100 enters the area. The specific area may be used to monitor all services in use by using wireless communication such as data transmission in the electronic device 100. The location management unit 152 may check whether the electronic device 100 entering a specific area exits the specific area by checking the AP information continuously.

Once a scan event occurs, the state management unit 151 may display a selection message for selecting one scan method to be performed among active scan and passive scan, on the output module 130. Once the input module 120 receives a signal for performing passive scan, the state management unit 151 may perform the passive scan by controlling the communication module 110. Once the input module 120 receives a signal for performing active scan, the state management unit 151 may perform the active scan by controlling the communication module 110. When active scan is selected for performance, the state management unit 151 may call the MAC address management unit 153. At this point, for convenience of description, the input module 120 receives a selection signal allowing the state management unit 151 to select a scan method in this specification but the present disclosure is not limited thereto. The state management unit 151 may select a scan method according to a type of a scan event that occurs.

The MAC address management unit 153 may display a selection message for selecting the transmission of at least one of a virtual MAC address or an original MAC address, on the output module 130. Once the input module 120 receives a signal for transmitting an original MAC address, the MAC address management unit 153 extracts an original MAC address stored in the MAC address information 141 and provides the original MAC address to the communication module 110. Once the input module 120 receives a signal for transmitting a virtual MAC address, the MAC address management unit 153 extracts at least one of a virtual MAC address stored in the MAC address information 141 and provides at least one of the virtual MAC address to the communication module 110. At this point, if the virtual MAC address is not stored in the MAC address information 141, the MAC address management unit 153 may generate at least one of a virtual MAC address and may then provide the virtual MAC address to the communication module 110. If a specific condition is satisfied, the MAC address management unit 153 may newly generate at least one of a virtual MAC address and may then provide at least one of the virtual MAC address to the communication module 110 or may provide the virtual MAC address to the MAC address information 141. For example, the MAC address management unit 153 may generate at least one of a virtual MAC address on the basis of a predetermined period and may generate at least one of a virtual MAC address each time a specific event occurs. The MAC address management unit 153 may terminate the transmission of an original MAC address or at least one of a virtual MAC address if it is confirmed that a scan event is terminated in the state management unit 151. At this point, the termination of a scan event may be an event for selecting an icon or a menu item provided in relation to wireless communication activation or inactivation, an event for terminating specific application execution, or a signal reception event for providing notice that the electronic device 100 exits a security area.

In such a way, in this specification, active scan and passive scan may be operated adaptively in accordance with a user's intention and when a scan method is performed through active scan, a virtual or original MAC address may be operated adaptively. Therefore, in this specification, an external device may not violate the user's privacy, for example, location tracking and location checking including a moving path of the electronic device 100, by using the MAC address of the electronic device 100.

Figure 2:
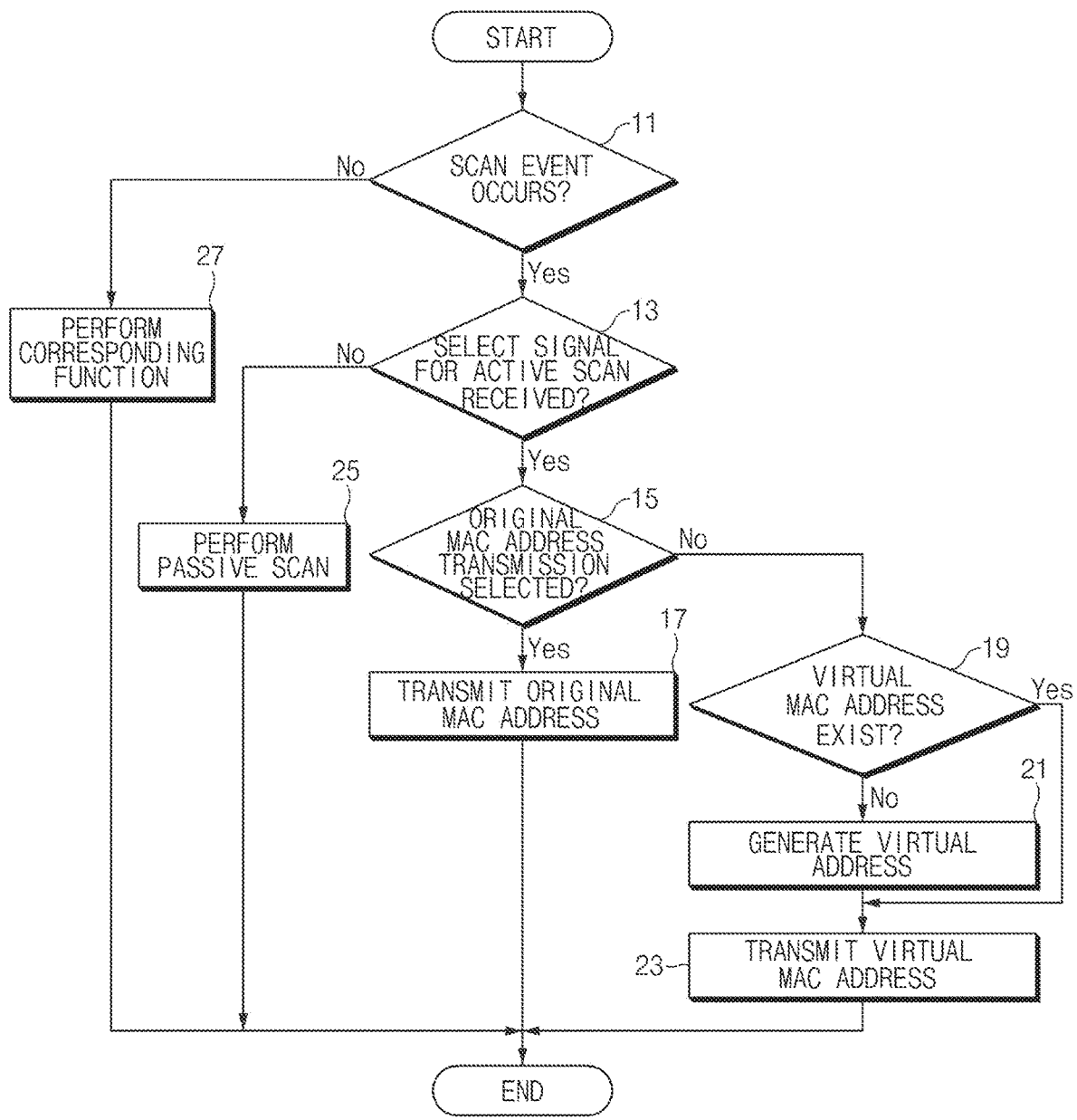
FIG. 2 is a flowchart illustrating a method of protecting privacy according to an embodiment of the present disclosure.

FIG. 2 is a flowchart illustrating a method of changing a MAC address according to an embodiment of the present disclosure.

Referring to FIG. 2, the control module 150 may check whether a scan event occurs in operation 11. At this point, the scan event may be an event for activating wireless communication in the input module 120, for example, a selection event for selecting an icon or a menu item provided in relation to wireless communication activation. At this point, the selection event may represent an event in which a user activates wireless communication through the input module 120 or the output module 130 when the user wants to use wireless communication service through wireless communication (for example, Wi-Fi and Bluetooth). The scan event may be a signal for application execution through the input module 120 or may be an operation signal of an application automatically executed during the booting of the electronic device 100. The scan event may be a signal for providing notice that the electronic device 100 enters a specific area, for example, a security area, by analyzing AP information received from the communication module 110. The location management unit 152 may receive AP information from at least one AP located within a threshold range of the electronic device 100 by controlling the communication module 110. The location management unit 152 may check whether the electronic device 100 enters a security area by analyzing the received AP information and comparing the received AP information with AP information stored in the security area information 143. At this point, the specific area may mean a security area for monitoring the position and moving path of the electronic device 100 when the electronic device 100 enters the area. The specific area may be used to monitor all services in use by using wireless communication such as data transmission in the electronic device 100.

According to a checked result in operation 11, if the scan event occurs in the electronic device 100, the control module 150 performs operation 13 and if the scan event does not occur, the control module 150 performs operation 27. In operation 27, the control module 150 may perform a corresponding function. At this point, the corresponding function may mean a specific function in an idle state or in execution by a user. In operation 13, if a select signal for performing active scan is received in the input module 120, the control module 150 performs operation 15 and if the select signal for performing active scan is not received in the input module 120, the control module 150 performs operation 25. In operation 25, the control module 150 may perform passive scan by controlling the communication module 110.

In operation 15, if a select signal for transmitting an original MAC address is received through the input module 120 during active scan, the control module 150 performs operation 17 and if the select signal for transmitting the original MAC address is not received through the input module 120 during the active scan, the control module 150 performs operation 19. In operation 17, the control module 150 may extract an original MAC address stored in the storage module 140 and may then transmit the original MAC address to the communication module 110.

In operation 19, the control module 150 may check whether a virtual MAC address exists in the storage module 140. According to a checked result in operation 19, if the virtual MAC address exists in the storage module 140, the control module 150 may perform operation 23. In operation 23, the control module 150 may extract a virtual MAC address stored in the storage module 140 and may then transmit the virtual MAC address to the communication module 110. According to a checked result in operation 19, if the virtual MAC address does not exist in the storage module 140, the control module 150 may perform operation 21. In operation 21, the control module 150 may generate at least one of a virtual MAC address (or a plurality of virtual MAC addresses) and may then perform operation 23. In operation 23, the control module 150 may transmit the generated at least one of a virtual MAC address through the communication module 110. At this point, at least one of the virtual MAC address may be generated periodically and the periodically generated virtual MAC address may be updated and stored in the storage module 140 periodically.

Figure 3A:
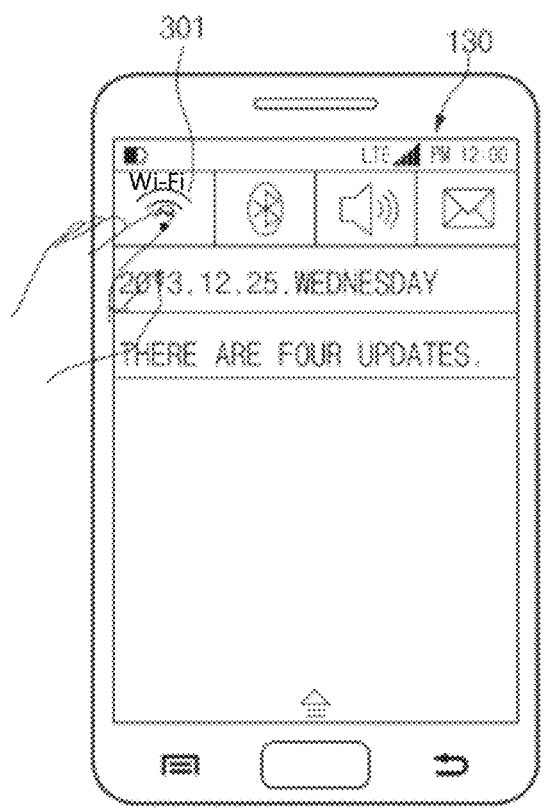
FIGS. 3A and 3B are views illustrating a screen where a scan event occurs through a user interface according to an embodiment of the present disclosure.
Figure 3B:
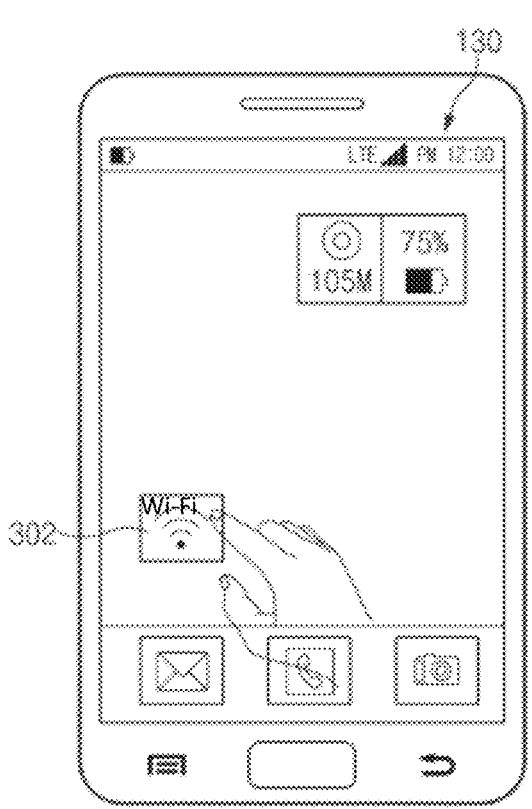

FIGS. 3A and 3B are views illustrating a screen where a scan event occurs through a user interface according to an embodiment of the present disclosure.

Referring to FIG. 3A, a user may select an icon 301 for activating a Wi-Fi communication module from icons displayed on a status bar at the upper part of the output module 130 as in FIG. 1.

Referring to FIG. 3B, a user may select a button 302 for activating a Wi-Fi communication module from short cut buttons displayed on a standby screen. When a selection event for activating Wi-Fi occurs, the control module 150 may recognize that a scan event occurs. Although not shown in the drawings, a selection event for activating wireless communication may occur through a setting menu provided from the electronic device 100.

Figure 4:
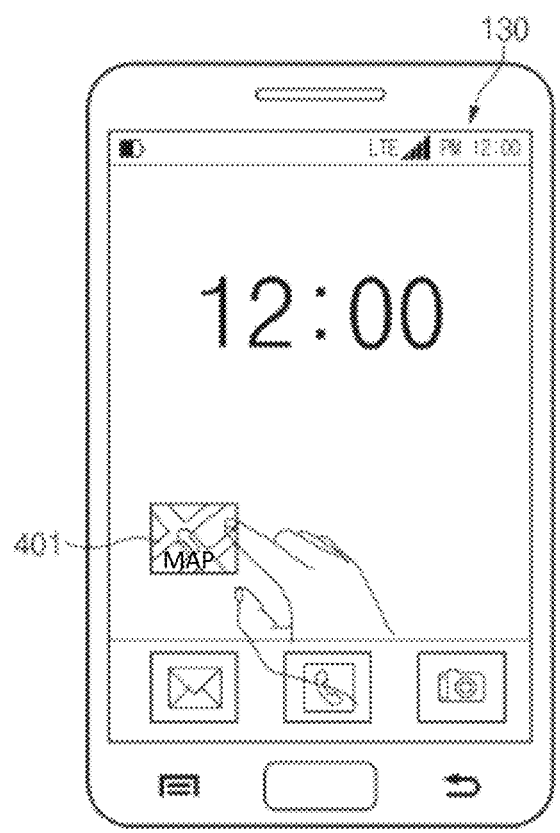
FIG. 4 is a view illustrating a screen where a scan event occurs through an application execution according to an embodiment of the present disclosure.

FIG. 4 is a view illustrating a screen where a scan event occurs through an application execution according to an embodiment of the present disclosure.

Referring to FIG. 4, a user may select a button 401 for executing a map application from short cut buttons displayed on a standby screen. When a selection event for executing a map application occurs, the control module 150 may recognize that a scan event occurs. Although not shown in the drawings, the selection event for executing the map application may occur through an application list menu provided from the electronic device 100.

Figure 5:
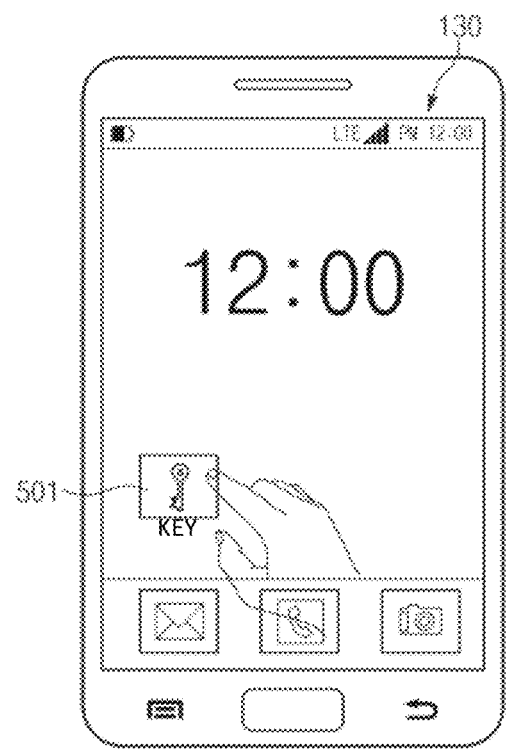
FIG. 5 is a view illustrating a screen where a scan event occurs through a change to a security mode according to an embodiment of the present disclosure.

FIG. 5 is a view illustrating a screen where a scan event occurs through a change to a security mode according to an embodiment of the present disclosure.

Referring to FIG. 5, a user may select a button 501 for executing a security application from short cut buttons displayed on a standby screen. When a selection event for executing a security application occurs, the control module 150 may recognize that a scan event occurs. Although not shown in the drawings, the selection event for executing the security application may occur through an application list menu provided from the electronic device 100.

Figure 6:
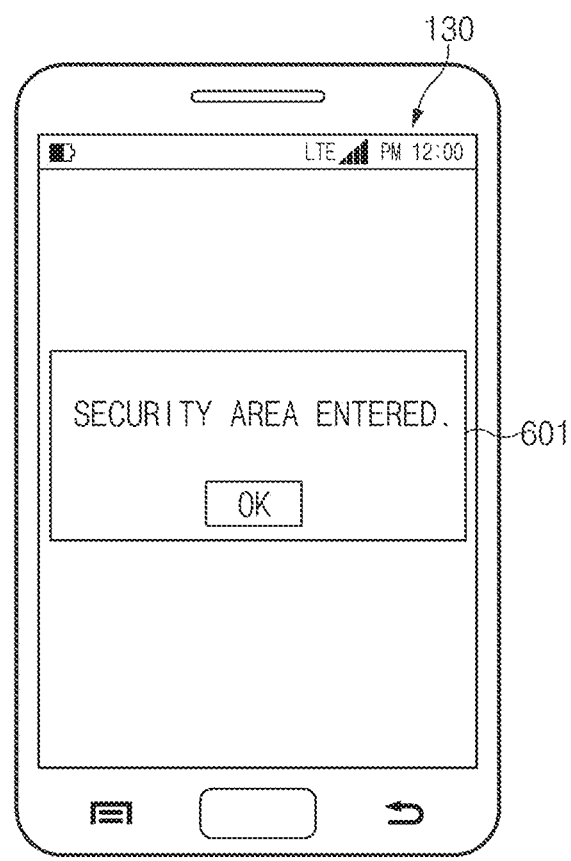
FIG. 6 is a view illustrating a screen where a scan event occurs through an entry to a security area according to an embodiment of the present disclosure.

FIG. 6 is a view illustrating a screen where a scan event occurs through an entry to a security area according to an embodiment of the present disclosure.

Referring to FIG. 6, once the electronic device 100 enters a specific area, the output module 130 may output a message pop-up window 601 for providing notice of the entry to a security area. Once the message pop-up window for providing notice that the electronic device 100 enters the security area is outputted, the control module 150 may recognize that a scan event occurs.

Figure 7A:
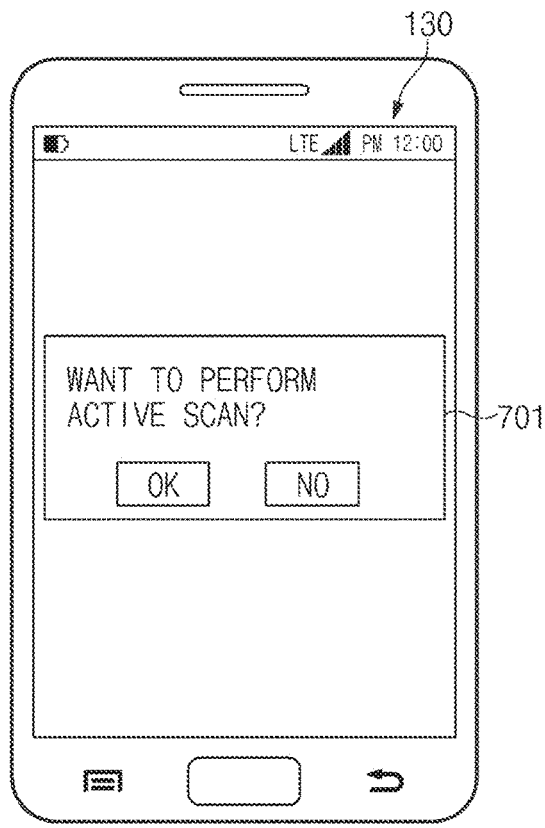
FIGS. 7A, 7B, and 7C are views illustrating a screen for selecting privacy protection when a scan event occurs according to an embodiment of the present disclosure.
Figure 7B:
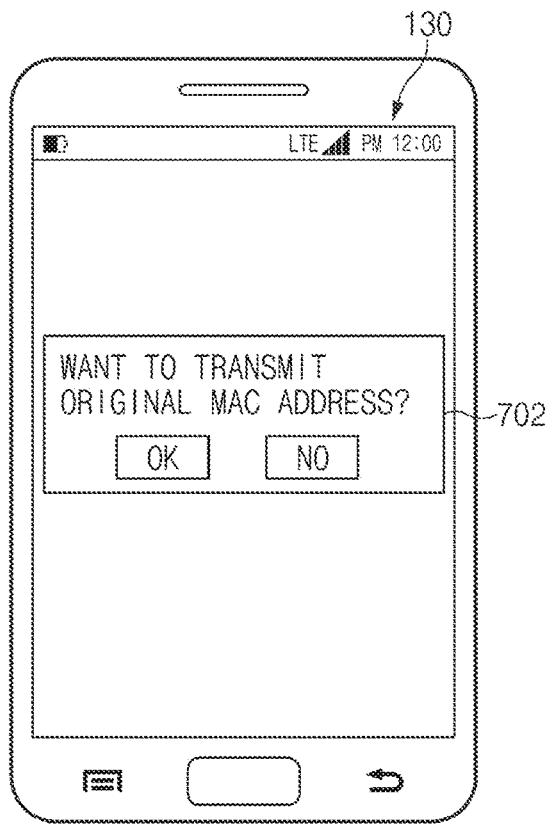
Figure 7C:
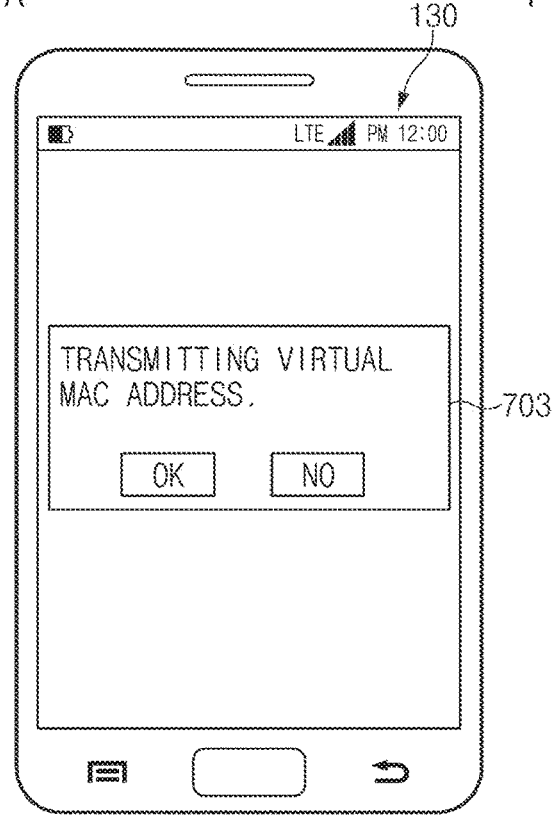

FIGS. 7A to 7C are views illustrating a screen for selecting privacy protection when a scan event occurs according to an embodiment of the present disclosure.

Referring to FIG. 7A, when it is confirmed that a scan event occurs, a screen may be disposed on the output module 130 of the electronic device 100. If 'NO' is selected from a message pop-up window 701, the electronic device 100 may perform passive scan. If 'OK' is selected from the message pop-up window 701, a screen may be displayed on the output module 130 of the electronic device 100 as shown in FIG. 7B.

Referring to FIGS. 7B and 7C, if 'OK' is selected from a message pop-up window 702, the electronic device 100 may transmit an original MAC address. If 'NO' is selected from the message pop-up window 702, the electronic device 100 may transmit a virtual MAC address and may display a message pop-up window 703 for providing notice of the transmission of the virtual MAC address on the output module 130. At this point, for convenience of the present disclosure, operations for FIG. 7A are necessarily performed as described above but the present disclosure is not limited thereto. The electronic device 100 may check whether to perform active scan according to the scan event occurring as shown in FIGS. 3A, 3B, and 4 to 6. In this case, a notification message pop-up window "operate in active scan" or "operate in passive scan" may be displayed instead of the message pop-up window for selection 701 of FIG. 7A.

As mentioned above, the present disclosure may select one of active scan and passive scan according to the need of a user and may freely select at least one of a virtual MAC address generation and delivery and original MAC address extraction and delivery during active scan. Accordingly, the present disclosure may prevent the invasion of privacy if a user does not want to be exposed.

Figure 8:
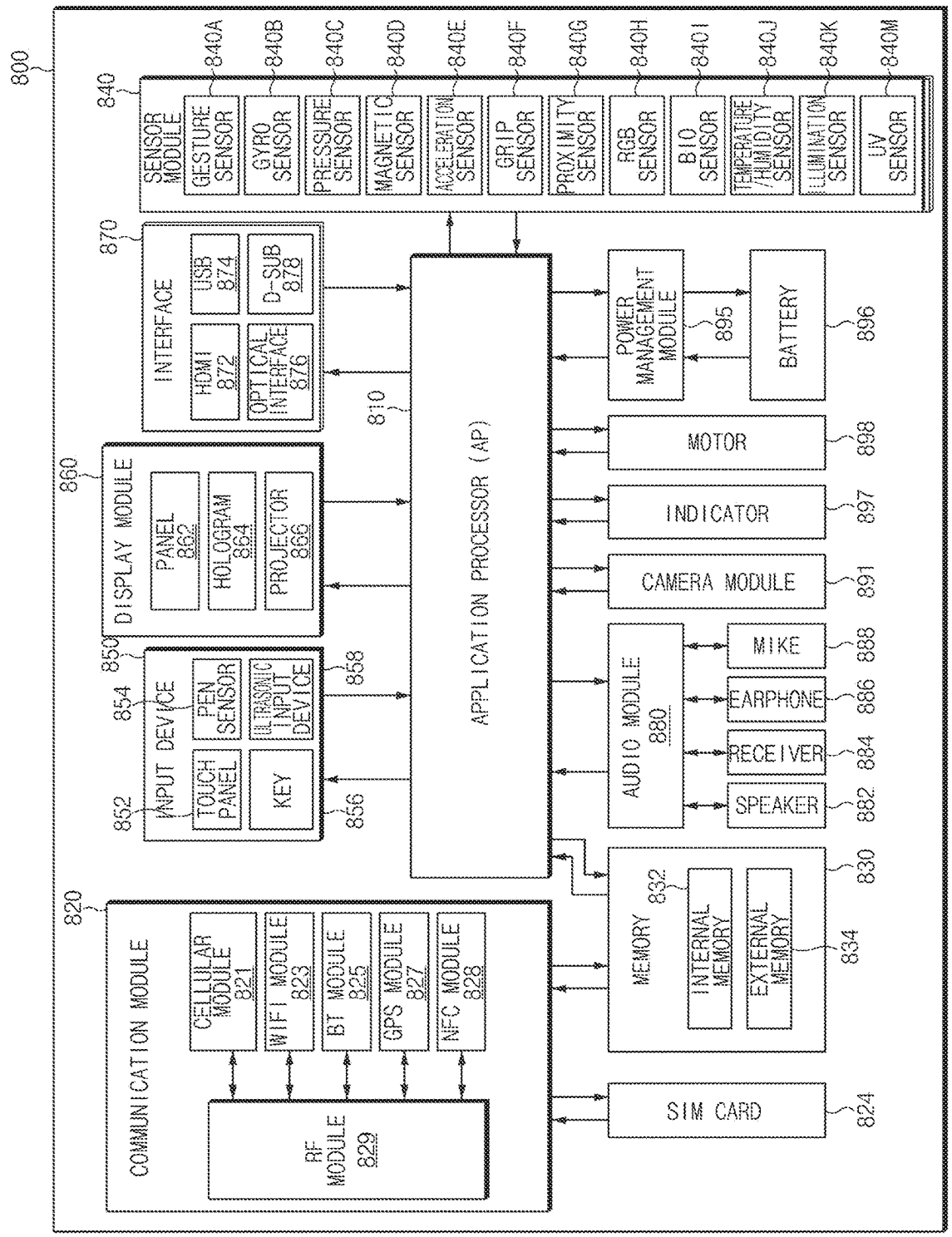
FIG. 8 is a block diagram illustrating an electronic device according to an embodiment of the present disclosure.

FIG. 8 is a block diagram illustrating an electronic device according to an embodiment of the present disclosure.

Referring to FIG. 8, the electronic device 800 may configure all or part of the electronic device 100 protecting the user's privacy shown in FIG. 1. The electronic device 800 includes at least one AP 810, a communication module 820, a Subscriber Identification Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 may control a plurality of hardware or software components connected to the AP 810 by executing an operating system or an application program and may perform various data processing and operations with multimedia data. The AP 810 may be implemented with a System on Chip (SoC), for example. According to an embodiment of the present disclosure, the AP 810 may further include a Graphic Processing Unit (GPU) (not shown).

The communication module 820 (for example, the communication module 110 of FIG. 1) may perform data transmission through communication between other electronic devices connected to the electronic device 800 (for example, the electronic device 100) via a network. According to an embodiment of the present disclosure, the communication module 820 may include a cellular module 821, a Wi-Fi module 823, a Blue Tooth (BT) module 825, a Global Positioning System (GPS) module 827, a Near Field Communication (NFC) module 828, and a Radio Frequency (RF) module 829.

The cellular module 821 may provide voice calls, video calls, text services, or internet services through a communication network (for example, LTE, LTE-A, CDMA, WCDMA, UMTS, WiBro, or GSM). Additionally, the cellular module 821 may distinguish and authenticate an electronic device in a communication network by using a subscriber identification module (for example, the SIM card 824). According to an embodiment of the present disclosure, the cellular module 821 may perform at least part of a function that the AP 810 provides. For example, the cellular module 821 may perform at least part of a multimedia control function.

According to an embodiment of the present disclosure, the cellular module 821 may further include a Communication Processor (CP). The cellular module 821 may be implemented with SoC, for example. As shown in FIG. 8, components such as the cellular module 821 (for example: a CP), the power management module 295, or the memory 830 are separated from the AP 810, but according to an embodiment of the present disclosure, the AP 810 may be implemented including some of the above-mentioned components (for example, the cellular module 821).

According to an embodiment of the present disclosure, the AP 810 or the cellular module 821 (for example, a CP) may load commands or data, which are received from a nonvolatile memory or at least one of other components connected thereto, into a volatile memory and may then process them. Furthermore, the AP 810 or the cellular module 821 may store data received from or generated by at least one of other components in a nonvolatile memory.

Each of the Wi-Fi module 823, the BT module 825, the GPS module 827, and the NFC module 828 may include a processor for processing data transmitted/received through a corresponding module. Although the cellular module 821, the Wi-Fi module 823, the BT module 825, the GPS module 827, and the NFC module 828 are shown as separate blocks in FIG. 8, according to an embodiment of the present disclosure, some (for example, at least two) of the cellular module 821, the Wi-Fi module 823, the BT module 825, the GPS module 827, and the NFC module 828 may be included in one Integrated Chip (IC) or an IC package. For example, at least some (for example, a CP corresponding to the cellular module 821 and a Wi-Fi processor corresponding to the Wi-Fi module 823) of the cellular module 821, the Wi-Fi module 823, the BT module 825, the GPS module 827, and the NFC module 828 may be implemented with one SoC.

The RF module 829 may be responsible for data transmission, for example, the transmission of an RF signal. Although not shown in the drawings, the RF module 829 may include a transceiver, a Power Amp Module (PAM), a frequency filter, or a Low Noise Amplifier (LNA). Additionally, the RF module 829 may further include components for transmitting/receiving electromagnetic waves on a free space in a wireless communication, for example, conductors or conducting wires. Although the cellular module 821, the Wi-Fi module 823, the BT module 825, the GPS module 827, and the NFC module 828 share one RF module 829 shown in FIG. 8, according to an embodiment of the present disclosure, at least one of the cellular module 821, the Wi-Fi module 823, the BT module 825, the GPS module 827, and the NFC module 828 may perform the transmission of an RF signal through an additional RF module.

The SIM card 824 may be a card including a subscriber identification module and may be inserted into a slot formed at a specific position of an electronic device. The SIM card 824 may include unique identification information (for example, an Integrated Circuit Card Identifier (ICCID)) or subscriber information (for example, an International Mobile Subscriber Identity (IMSI)).

The memory 830, for example, the storage module 140 of FIG. 1, may include an internal memory 832 or an external memory 834. The internal memory 832 may include at least one of a volatile memory (for example, Dynamic RAM (DRAM), Static RAM (SRAM), Synchronous Dynamic RAM (SDRAM)) and a nonvolatile memory (for example, One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

According to an embodiment of the present disclosure, the internal memory 832 may be a Solid State Drive (SSD). The external memory 834 may further include flash drive, for example, Compact Flash (CF), Secure Digital (SD), Micro Secure Digital (Micro-SD), Mini secure digital (Mini-SD), extreme digital (xD), or memory stick. The external memory 834 may be functionally connected to the electronic device 800 through various interfaces. According to an embodiment of the present disclosure, the electronic device 800 may further include a storage device (or a storage medium) such as a hard drive.

The sensor module 840 measures physical quantities or detects an operating state of the electronic device 800, thereby converting the measured or detected information into electrical signals. The sensor module 840 may include at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (for example, a Red, Green, Blue (RGB) sensor), a bio sensor 840I, a temperature/humidity sensor 840J, an illumination sensor 840K, and a Ultra Violet (UV) sensor 840M. Additionally/alternately, the sensor module 840 may include an E-nose sensor (not shown), an Electromyography (EMG) sensor, an Electroencephalogram (EEG) sensor (not shown), an Electrocardiogram (ECG) sensor (not shown), an Infrared (IR) sensor (not shown), an iris sensor (not shown), or a fingerprint sensor (not shown). The sensor module 840 may further include a control circuit for controlling at least one sensor therein.

The input device 850, for example, the input module 120 of FIG. 1, may include a touch panel 852, a (digital) pen sensor 854, a key 856, or an ultrasonic input device 858. The touch panel 852 (for example, the output module 130) may recognize a touch input through at least one of capacitive, resistive, infrared, or ultrasonic methods, for example. Additionally, the touch panel 852 may further include a control circuit. In the case of the capacitive method, both direct touch and proximity recognition are possible. The touch panel 852 may further include a tactile layer. In this case, the touch panel 852 may provide a tactile response to a user.

The (digital) pen sensor 854 may be implemented through a method similar or identical to that of receiving a user's touch input or an additional sheet for recognition. The key 856 (for example, the input module 120) may include a physical button, an optical key, or a keypad. The ultrasonic input device 858, as a device checking data by detecting micro sound waves in the electronic device 800, may provide wireless recognition through an input tool generating ultrasonic signals. According to an embodiment of the present disclosure, the electronic device 800 may receive a user input from an external device (for example, a computer or a server) connected to the electronic device 200 through the communication module 820.

The display 860, for example, the output module 130 of FIG. 1, may include a panel 862, a hologram 864, or a projector 866. The panel 862 may include a LCD or an AM-OLED, for example. The panel 862 may be implemented to be flexible, transparent, or wearable, for example. The panel 862 and the touch panel 852 may be configured in one module. The hologram 864 may show three-dimensional images in the air by using light interference. The projector 866 may display an image by projecting light on a screen. The screen, for example, may be placed inside or outside the electronic device 800. According to an embodiment of the present disclosure, the display 860 may further include a control circuit for controlling the panel 862, the hologram 864, or the projector 866.

The interface 870 may include a High-Definition Multimedia Interface (HDMI) 872, a Universal Serial Bus (USB) 874, an optical interface 876, or a D-subminiature (D-sub) 878. Additionally/alternately, the interface 870 may include a Mobile High-definition Link (MHL) interface, an SD card/Multi-Media Card (MMC) interface, or an infrared Data Association (IrDA) standard interface.

The audio module 880 may convert sound and electrical signals in both directions. The audio module 880 may provide sound information inputted/outputted through a speaker 882, a receiver 884, an earphone 886, or a mike 888.

The camera module 891, as a device for capturing an image and a video, may include at least one image sensor (for example, a front sensor or a rear sensor), a lens (not shown), an Image Signal Processor (ISP) (not shown), or a flash LED (not shown) (for example, an LED or a xenon lamp).

The power management module 895 may manage the power of the electronic device 800. Although not shown in the drawings, the power management module 895 may include a Power Management Integrated Circuit (PMIC), a charger Integrated Circuit (IC), or a battery or fuel gauge, for example.

The PMIC may be built in an IC or SoC semiconductor, for example. A charging method may be classified as a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

A battery gauge may measure the remaining amount of the battery 896, or a voltage, current, or temperature of the battery 896 during charging. The battery 896 may store or generate electricity and may supply power to the electronic device 800 by using the stored or generated electricity. The battery 896, for example, may include a rechargeable battery or a solar battery.

The indicator 897 may display a specific state of the electronic device 800 or a part thereof (for example, the AP 810), for example, a booting state, a message state, or a charging state. The motor 898 may convert electrical signals into mechanical vibration. Although not shown in the drawings, the electronic device 800 may include a processing device (for example, a GPU) for mobile TV support. The processing device for mobile TV support may process media data according to the standards such as Digital Multimedia Broadcasting (DMB), Digital Video Broadcasting (DVB), or media flow.

In relation to an electronic device and method for protecting the user's privacy according to the above-mentioned various embodiments of the present disclosure, the electronic device selectively performs active scan and passive scan and generates and provides a virtual MAC address during the active scan. Therefore, the occurrence of a user's privacy being compromised regardless of the user's intentions may be minimized.

Each of the above-mentioned components of the electronic device according to this disclosure may be configured with at least one component and the name of a corresponding component may vary according to the kind of an electronic device. The electronic device according to this disclosure may be configured including at least one of the above-mentioned components. Moreover, some components may be omitted or additional other components may be further included. Additionally, some components of an electronic device according this disclosure are configured as one entity, so that functions of previous corresponding components may be performed identically.

The term "module" used in this disclosure, for example, may mean a unit including a combination of at least one of hardware, software, and firmware. The term "module" and the term "unit", "logic", "logical block", "component", or "circuit" may be interchangeably used. "Module" may be a minimum unit or part of an integrally configured component. "Module" may be a minimum unit performing at least one function or part thereof. "Module" may be implemented mechanically or electronically. For example, "module" according to this disclosure may include at least one of an Application-Specific Integrated Circuit (ASIC) chip performing certain operations, Field-Programmable Gate Arrays (FPGAs), or a programmable-logic device, all of which are known or are developed in the future.

According to various embodiments, at least part of a device (for example, modules or functions thereof) or a method (for example, operations) according to this disclosure, for example, as in a form of a programming module, may be implemented using an instruction stored in computer-readable storage media. When at least one processor executes an instruction, it may perform a function corresponding to the instruction. The computer-readable storage media may include a memory, for example. At least part of a programming module may be implemented (for example, executed) by a processor, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of this disclosure and vice versa.

A module of a programming module according to this disclosure may include at least one of the above-mentioned components or additional other components. Or, some programming modules may be omitted. Operations performed by a module, a programming module, or other components according to this disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for protecting privacy of a user, the electronic device comprising:
a transceiver configured to transmit and receive wireless communication signal of a Wi-Fi network; and
at least one processor configured to:
control the transceiver to perform an active scan, when the Wi-Fi network is used to identify a location of the electronic device,
control the transceiver to transmit one or more probe request frames including a virtual media access control (MAC) address to an access point of the Wi-Fi network while the active scan is performed, when the Wi-Fi network is used to identify the location of the electronic device, and
control the transceiver to transmit one or more frames including an original MAC address from among the original MAC address and the virtual MAC address, when the transceiver receives a signal to transmit the original MAC address,
wherein for transmitting the one or more probe request frames including the virtual MAC address, the transceiver generates the virtual MAC address when the virtual MAC address for the Wi-Fi network is not stored in the electronic device and utilizes the virtual MAC address when the virtual MAC address for the Wi-Fi network is stored in the electronic device, and
wherein the at least one processor is further configured to determine whether the electronic device enters a specific area or not by using the Wi-Fi network.

2. The electronic device according to claim 1, wherein the at least one processor is further configured to provide an indication of whether the electronic device enters the specific area.

3. The electronic device according to claim 1, wherein the at least one processor is further configured to generate the virtual MAC address periodically.

4. The electronic device according to claim 1, wherein the at least one processor is further configured to transmit one of a plurality of virtual MAC addresses selectively, when transceiving is performed during the active scan.

5. The electronic device according to claim 1, wherein the at least one processor is further configured to control the transceiver to perform a passive scan, when the transceiver receives a signal to perform the passive scan.

6. The electronic device according to claim 1, wherein the at least one processor is further configured to receive one or more probe response request from the access point of the Wi-Fi network.

7. The electronic device according to claim 1, wherein, when the transceiver receives the signal to transmit the original MAC address, the processor is further configured to determine a type of MAC address to transmit from among the original MAC address or the virtual MAC address.

8. A method for protecting privacy of a user, the method comprising:
transmitting and receiving wireless communication signals of a Wi-Fi network;
controlling a transceiver to perform an active scan, when the Wi-Fi network are used to identify a location of an electronic device;
controlling the transceiver to transmit one or more probe request frames including a virtual media access control (MAC) address to an access point of the Wi-Fi network while the active scan is performed, when the Wi-Fi network is used to identify the location of the electronic device;
controlling the transceiver to transmit one or more frames including an original MAC address from among the original MAC address and the virtual MAC address, when the transceiver receives a signal to transmit the original MAC address;
determining whether the electronic device enters a specific area or not; and
using the Wi-Fi network, when the electronic device enters the specific area,
wherein for transmitting the one or more probe request frames including the virtual MAC address, the transceiver generates the virtual MAC address when the virtual MAC address for the Wi-Fi network is not stored in the electronic device and utilizes the virtual MAC address when the virtual MAC address for the Wi-Fi network is stored in the electronic device.

9. The method according to claim 8, further comprising:
providing an indication of whether the electronic device enters the specific area.

10. The method according to claim 8, further comprising:
generating the virtual MAC address periodically.

11. The method according to claim 8, further comprising:
transmitting one of a plurality of virtual MAC addresses selectively, when transceiving is performed during active scan.

12. The method according to claim 8, further comprising:
controlling the transceiver to perform a passive scan, when the transceiver receives a signal for performing the passive scan.

13. The method according to claim 8, further comprising:
receiving one or more probe response request from the access point of the Wi-Fi network.

* * * * *